US005758334A

United States Patent [19]
Knight, III et al.

[11] Patent Number: 5,758,334
[45] Date of Patent: May 26, 1998

[54] FILE SYSTEM REMOUNT OPERATION WITH SELECTABLE ACCESS MODES THAT SAVES KNOWLEDGE OF THE VOLUME PATH AND DOES NOT INTERRUPT AN EXECUTING PROCESS UPON CHANGING MODES

[75] Inventors: Joshua Wilson Knight, III, Mohegan Lake; William James Schoen, Poughkeepsie, both of N.Y.

[73] Assignee: International Business Machines Corporation, Armonk, N.Y.

[21] Appl. No.: 498,071

[22] Filed: Jul. 5, 1995

[51] Int. Cl.⁶ ............................................. G06F 17/30
[52] U.S. Cl. ............................ 707/2; 707/1; 707/10; 707/100
[58] Field of Search ..................... 395/600, 60; 707/1, 707/2, 10, 100

[56] References Cited

U.S. PATENT DOCUMENTS 4,887,204 12/1989 Johnson et al. ...................... 707/10
5,218,695 6/1993 Noveck et al. ....................... 707/205
5,313,646 5/1994 Hendricks et al. ................... 707/101
5,522,090 5/1996 Tanaka et al. ....................... 395/894
5,566,927 10/1996 Devarakonda et al. ........... 395/182.13
5,574,903 11/1996 Szymanski et al. .................... 707/1

*Primary Examiner*—Thomas G. Black
*Assistant Examiner*—Greta L. Robinson
*Attorney, Agent, or Firm*—Richard M. Ludwin; Ronald L. Drumheller

[57] ABSTRACT

A system and method are provided for processing filesystem commands for use in a computing system of a type in which a filesystem can be mounted multiple access modes. Responsive to a remount command, the filesystem access mode is changed from a present access mode (such as read-only) to another access mode (such as read-write) without disruption of the processes executing in the computing system.

16 Claims, 4 Drawing Sheets

FILE SYSTEM REMOUNT OPERATION WITH SELECTABLE ACCESS MODES THAT SAVES KNOWLEDGE OF THE VOLUME PATH AND DOES NOT INTERRUPT AN EXECUTING PROCESS UPON CHANGING MODES

I. BACKGROUND OF THE INVENTION

1. FIELD OF THE INVENTION

This invention relates to the mounting and dismounting of filesystems.

2. Related Art

In a general purpose computing system, such as those supporting versions of the Unix operating system, applications may access data stored on disk drives by means of a set of operating system services including a filesystem. A filesystem is a set of files on a disk and the program tools for maintaining the set of files.

Filesystems that control the physical representation of objects such as directories and files are known as physical filesystems. A physical filesystem can be thought of as including two parts, the programs that control the physical representation of the files and the files themselves as stored on the disk.

The process of making the files on a disk available to users of the computing system is referred to as "mounting a filesystem". When a filesystem is mounted, the filesystem's control program reads certain information from the disk concerning the layout of filesystem objects. From this information, the filesystem constructs data structures known as "virtual filesystems" or Vfs's. Each time a file is opened, or made accessible, the filesystem creates a data structure, referred to as a "vnode", which is chained to the vfs.

Each vnode contains information about a given file and contains references to physical file system data structures, sometimes referred to as "sinodes, "gnodes", "inodes" or "cnodes". The physical file system data structures contain information such as the owner of the file, the size of the file, the date and time of the file's creation and the location of the blocks of the file on the disk. When Unix filesystems are mounted, they are generally "mounted over" a "stub" directory that acts as a placeholder and allows a system's filesystem hierarchy to resemble an uninterrupted tree.

In a distributed computing environment, a number of computing systems can be interconnected by way of a communication network or other coupling facility and can share files by way of a distributed filesystem. Access to the shared files is commonly coordinated by program modules referred to as the physical filesystem importer and the physical filesystem exporter. The filesystem exporter is typically executed on the server node (the computing system that controls access to the disk containing the filesystem data), while the filesystem importer is typically executed on the client nodes (other nodes that wish to access the files on the disk). Accesses to shared files made by users on the client nodes are referred to as "remote" accesses. Accesses to shared files made by users on the server node are referred to as "local" accesses.

The physical filesystem exporter processes requests for filesystem operations from remote clients. The exporter acts as an interface between the remote clients virtual filesystems and the physical filesystem, performing any physical filesystem manipulation required to process the requests. The physical filesystem importer is the client side interface to the physical filesystem exporter. The importer intercepts requests for filesystem operations on the virtual filesystems and appropriately formats corresponding request messages for processing by the physical filesystem exporter.

Conventionally, a filesystem can be mounted in one of two modes, Read-Only and Read/Write. In Read-Only mode nodes can read the filesystem but can not change its contents or attributes. In Read/Write mode any node can change the contents or attributes of the filesystem. In some systems, restrictions are placed on writing to the filesystem or changing the attributes in Read/Write mode.

In some systems, a given filesystem can be mounted in read-write mode, and in memory caching is used to enable access to individual files. Access to the individual files can be designated as read-only or read-write. Such a system is shown, for example, in U.S. Pat. No. 4,887,204. One problem with such systems, is that leaving a shared filesystem mounted in read-write mode may require complex serialization to ensure data integrity and high performance.

Having an entire filesystem mounted in Read-Only mode enables high performance, via in memory caching of filesystem attribute data and file data without requiring complex serialization. However, when maintenance of such systems is required, the operation of applications accessing the Read-Only file system can be disrupted. For example, if the Read-Only filesystem in question is the root filesystem of a POSIX file system, the entire filesystem must be restarted.

II. SUMMARY OF THE INVENTION

In light of the foregoing, the present invention comprises a system and method for processing filesystem commands for use in a computing system of a type in which a filesystem can be mounted in any one of a plurality of access modes (such as a read-only mode wherein processes have read-only access to the data in the filesystem and a read/write mode wherein processes can read and write to the data in the file system). In accordance with the method, responsive to a remount command, the filesystem access mode is changed from a present access mode (such as read-only) to another access mode (such as read-write) without disruption of the processes executing in the computing system.

III. BRIEF DESCRIPTION OF THE DRAWING

IV. DETAILED DESCRIPTION OF THE PREFERRED EMBODIMENT

Figure 1:
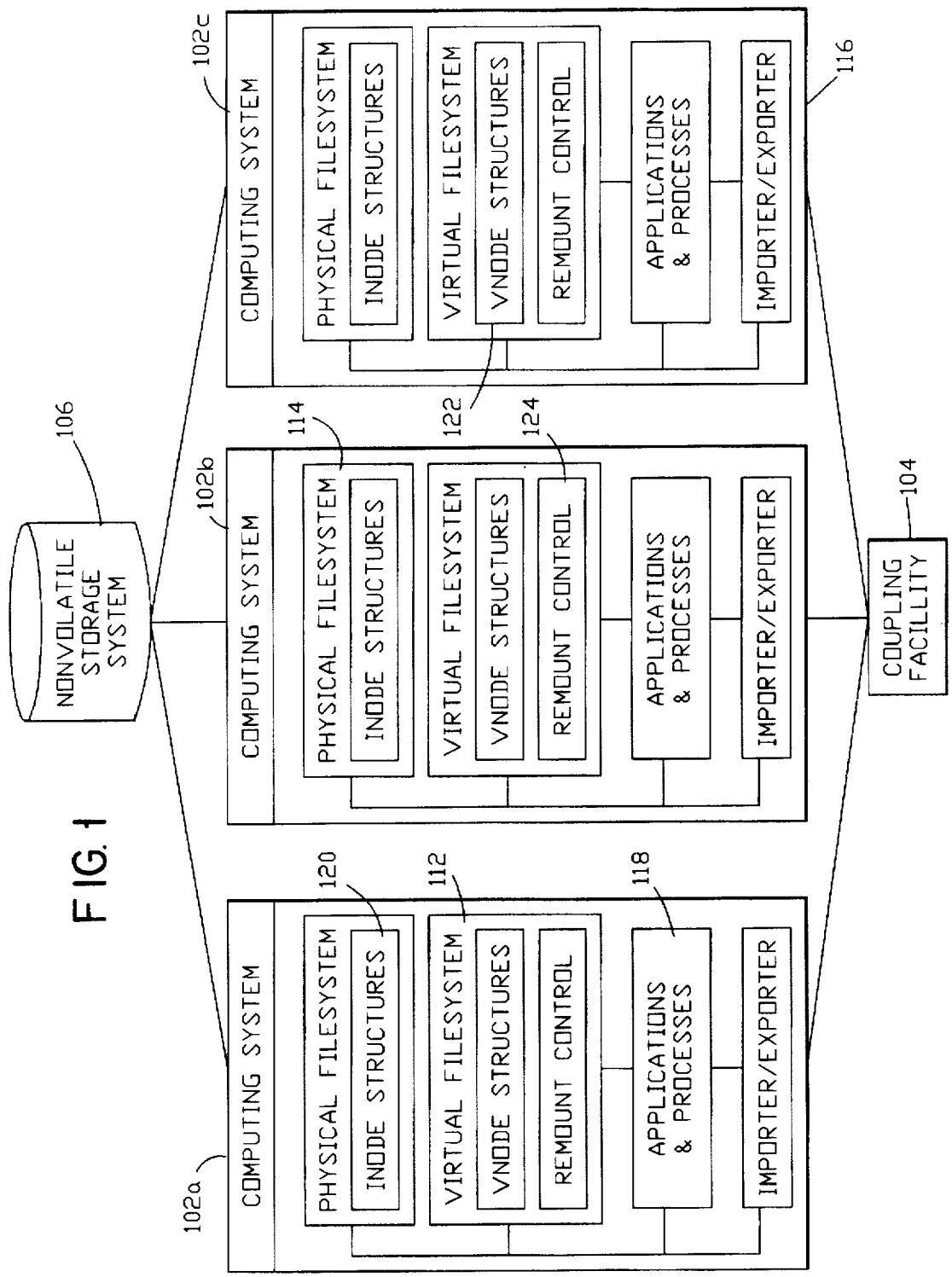
FIG. 1 depicts a coupled system suitable for use with the present invention.

The system of the present invention can be embodied in a coupled computing system of the type shown in FIG. 1. The system of FIG. 1 includes a number of computing systems 102a–102c or processing nodes interconnected by way of a coupling facility 104. The computing systems can be embodied, for example, on IBM System 3090 Sysplex using MVS 5.2.2 or AIX 3.2. The coupling facility 104 can be, for example, a Structured External Storage (SES) of the type described in U.S. Pat. No. 5,317,739 to Elko et al., which is incorporated by reference herein as if printed in full below. Each of the computing systems is also coupled to a port of a nonvolatile storage system 106, which can be, for example, a multiported disk storage system. The computing systems can access the storage system directly, although access to given files or filesystems can be restricted by conventional access and ownership protocols.

Each computing system includes a number of virtual filesystem 112 structures, physical filesystem structures 114, and an importer/exporter 116. Each of these structures are embodied as program code and data structures in the random access memory or non-volatile storage of each computing system. The virtual filesystem structures include one or more virtual filesystems. Each of the above-described blocks runs under control of an operating system (not shown) such as MVS, UNIX or AIX. As is known in the art, each of the nodes can be a "server" with respect to filesystems on disks which it controls.

Each of the computing systems nodes can be running one or more processes and/or applications 118 which can request access to the shared files and directories. Each system communicates with the filesystems on the non-volatile system storage system 106 by way of the virtual filesystem 112 and a physical filesystem 114. The physical filesystem 114 includes conventional inode structures 120 which are coupled to conventional vnode structures 118 in the virtual filesystem. The importer/export 116 handles the processing of requests between computing systems, not otherwise handled by the virtual filesystem.

The importer function is analogous to the function of a physical filesystem. The difference is that instead of servicing the requests from the virtual filesystem by accessing local non-volatile storage, the importer on a client node communicates with the exporter on the server node. The exporter on the server node makes the appropriate requests of the physical filesystem on the server node to provided the requested function and then returns the results of the requests to the importer on the client node via the communications network. The importer maintains control structures similar to those for local accesses but which control the communication with the server node for that file or filesystem instead of controlling access to local non-volatile storage. The exporter maintains control structures that couple the importer control structures on the clients nodes to the physical control structures on the server node.

The system of FIG. 1 also includes a remount control module 124 in each computing system which performs conventional mount and unmount operations on filesystems as well as remount operation processing in accordance with the principles of the present invention. Each remount control module 124 is preferably embodied as program code instantiated in the memory of a respective computing system.

The present system can also be embodied in the context of a distributed system of a type shown un U.S. Pat. No. 4,887,204 to Johnson et al. (issued on Dec. 12, 1989 and assigned to the same assignee as the present invention), which is incorporated by reference herein as if printed in full below.

Figure 4:
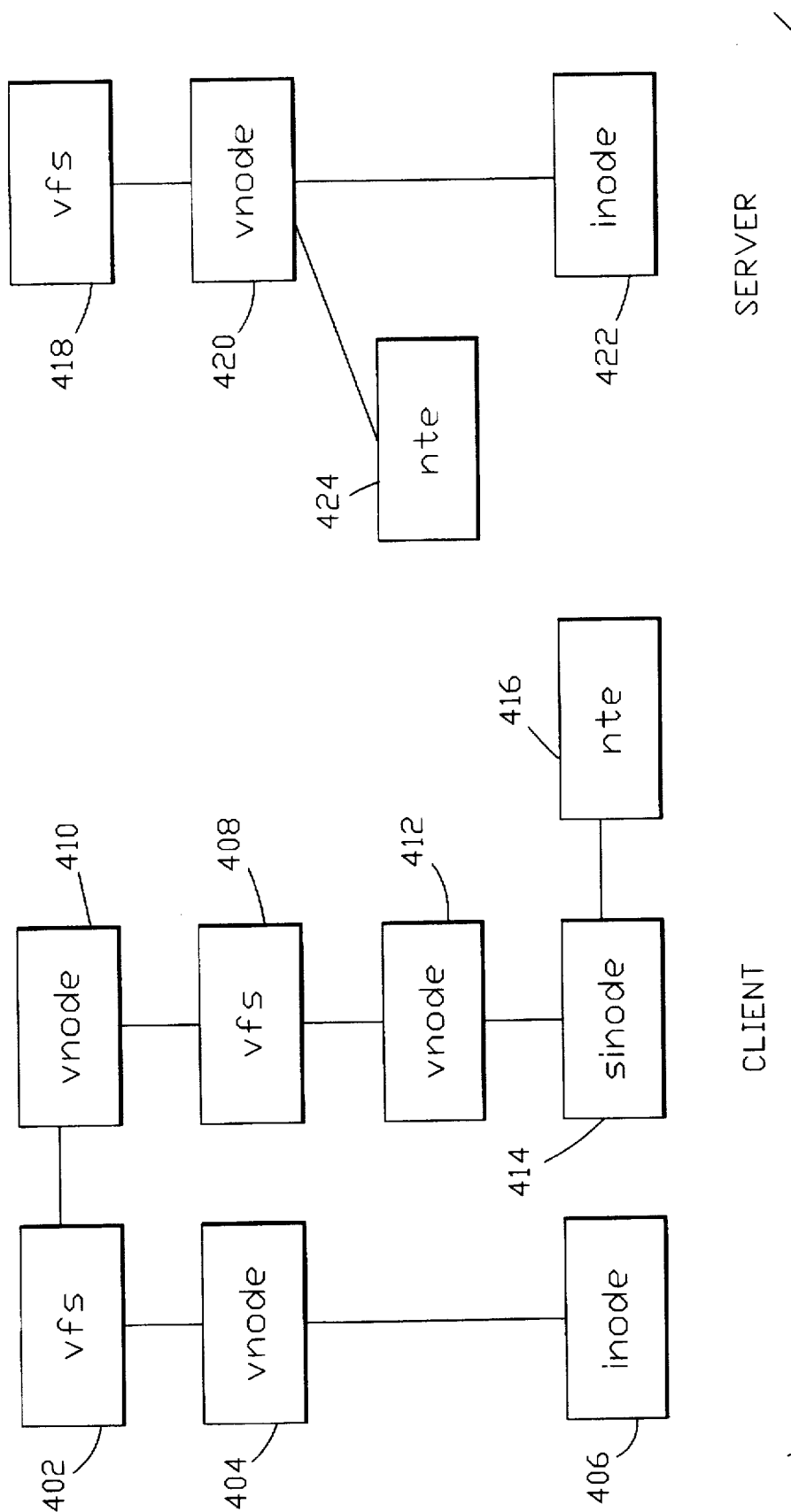

A more detailed diagram of the pertinent data structures for a coupled system is shown in FIG. 4. The left hand side of FIG. 4 shows pertinent data structures in a client node. The client node has a root virtual filesystem structure (vfs) 402. The root vfs 402 has a pointer to a local virtual node (vnode) 404 which, in turn, has a pointer to a local index node (inode) 406. A client node may have access to files which reside in a remote server node. Such a client gains access to a server's files by mounting one of the server's filesystems. In the client node, the data structures created by a remote mount operation compare to those created mounting a local entity in the following ways. Just as in the local case, a remote mount creates a vfs 408 in the client node which is pointed to by a local vnode 410. Just as in the local case, use of a file in a virtual filesystem which contains remote files creates a vnode structure 412 in the client node. Just as in the local case, the vnode structure has a pointer has a pointer to a inode table entry. The inode table entry, however, does not contain the inode information from the remote file. Instead, the inode table entry contains a surrogate inode (sinode) 414. This surrogate inode stands for, or represents, the remote inode and has a pointer to a node table entry (nte) 416. The nte 416 contains the information required by the client to communicate with the server.

The right hand side of FIG. 4 shows pertinent data structures in the server node. In the server node, some data structures are constructed to allow the server to record state information about how remote nodes are using its files. More specifically, each server has a "dummy" vfs 418 to provide a vfs to hold files open by remote clients. The dummy vfs is not part of the servers file tree. For each file which is open by a remote node, there is a vnode 420 in the servers dummy vfs. Each file which is open by a remote node has an inode table entry 422 in the servers inode table. This inode table entry 422 is the same as that which exists because a local process at the server has a file open. The vnode 420 also has a pointer to an nte 424 which contains the information required by the server to communicate with the client.

When a client and a server communicate about a server file, they need a way to identify the file. This is done with a file handle. When a client request causes the server to reply with a designate of a particular file (e.g. a remote look-up request), the file is identified by a file handle. When a client request carries a designation of a particular file (e.g. a remote open request) the file is identified by a file handle. The file handle contains the following fields: device number, inode number, and inode generation number.

The need for a file handle is illustrated by the following scenario. Suppose a client makes a request of a server and gets a file handle in reply. The clients stores and remembers the file handle. Some activity at the server causes the file to be deleted and the inode slot reused for another file. The client makes a request of the server using the stored file handle. The server receives the file handle and performs the operation on the new file. This would be an unacceptable operation.

This flaw is prevented by use of the inode generation number. The inode generation number is stored on disk as a field in the inode. When the server deletes a file, it increments the inode generation number. If a request arrives at the server, the file handle is broken apart, the device number and the inode number are used to locate the inode and then the file handle inode generation number is compared to the inode's inode generation number. If they are different, then the request is rejected.

When a client wants to open a file which resides on a remote server is uses a network transport mechanism to establish a connection with the server. Subsequent transactions regarding this file (e.g. read, write, etc.) flow on this connection. Each node contains a node table. A node uses entries in its node table (e.g. 416) to record information about existing connections to remote nodes.

More details of coordinating accesses in network connected system for a filesystem mounted read write are described in U.S. Pat. No. 4,887,204.

Figure 2:
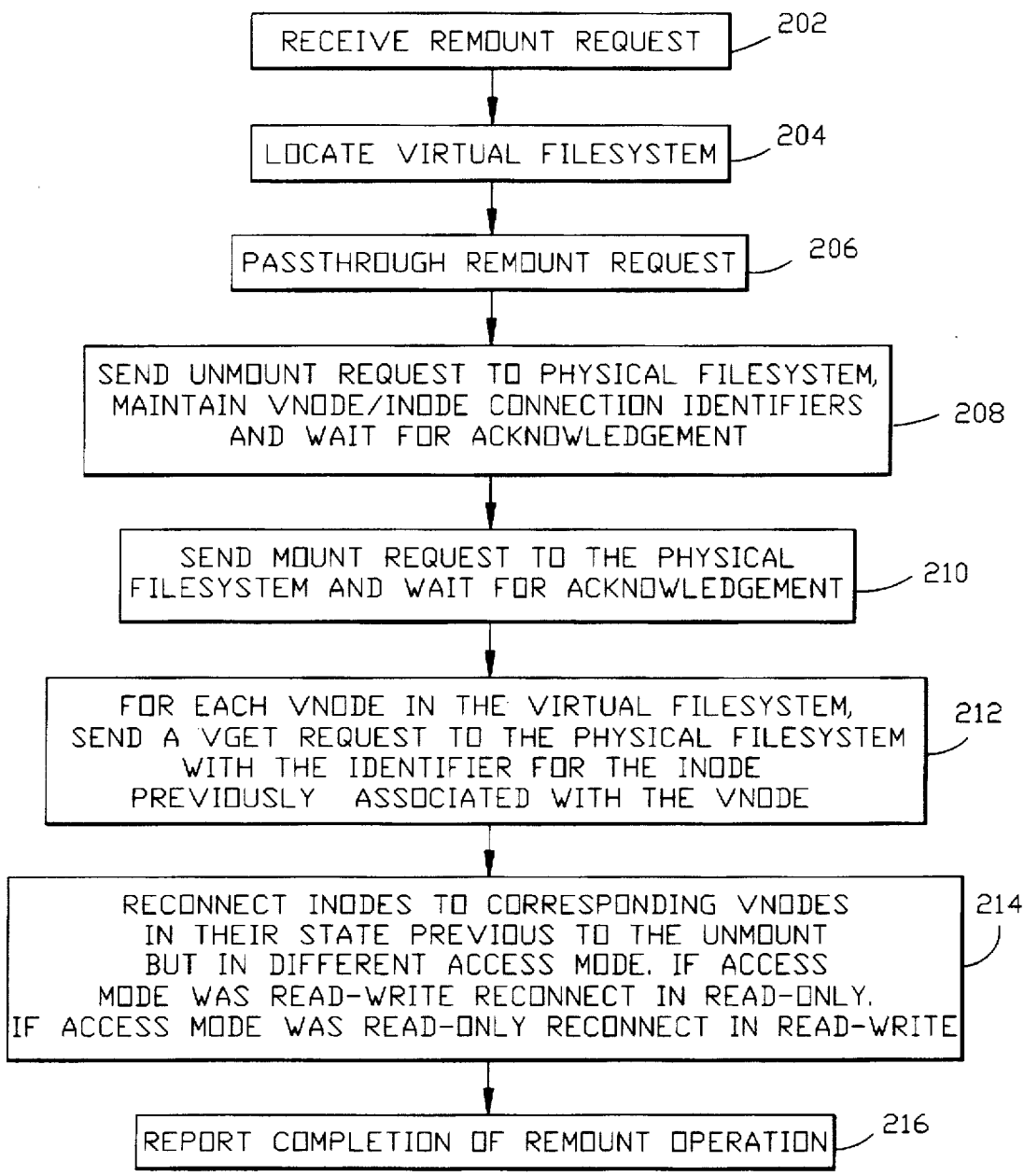
FIG. 2 is a flow chart of the remount process.

An overview of the remount operation is shown in FIG. 2. Preferably, the remount operation is performed by supervisory program code executing in the systems mount control module.

The remount program is entered in step 202 in response to a remount command being issued to the mount control module of the owner of the filesystem. The remount command can originate, for example, from an operator (who enters a command via an input device) or from a program, via the operating system program interface. In any event, in step 204 the appropriate virtual filesystem is identified and then in step 206 the remount command is passed from the operating system to the appropriate virtual filesystem by way of the remount control module.

In step 208, the virtual filesystem sends an unmount request to the physical filesystem. Even though the unmount request has been issued, the virtual filesystem retains (in registers or random access memory locations) its vnodes and identifiers for corresponding inodes in the physical filesystem.

In step 210, after completion of the unmount request has been acknowledged by the physical filesystem, the virtual filesystem sends a mount request to the physical filesystem.

In step 212, for each vnode, the virtual filesystem sends a "vget" request to the physical filesystem with the identifier for the inode that was previously associated with the vnode. These are the identifiers that were retained in step 208.

In step 214, the identified inodes are reconnected to the corresponding vnodes in their state previous to the unmount request. This reconnection is accomplished as shown in FIG. 3.

In step 216, the virtual filesystem reports to the mount control that the remount operation is complete.

Figure 3:
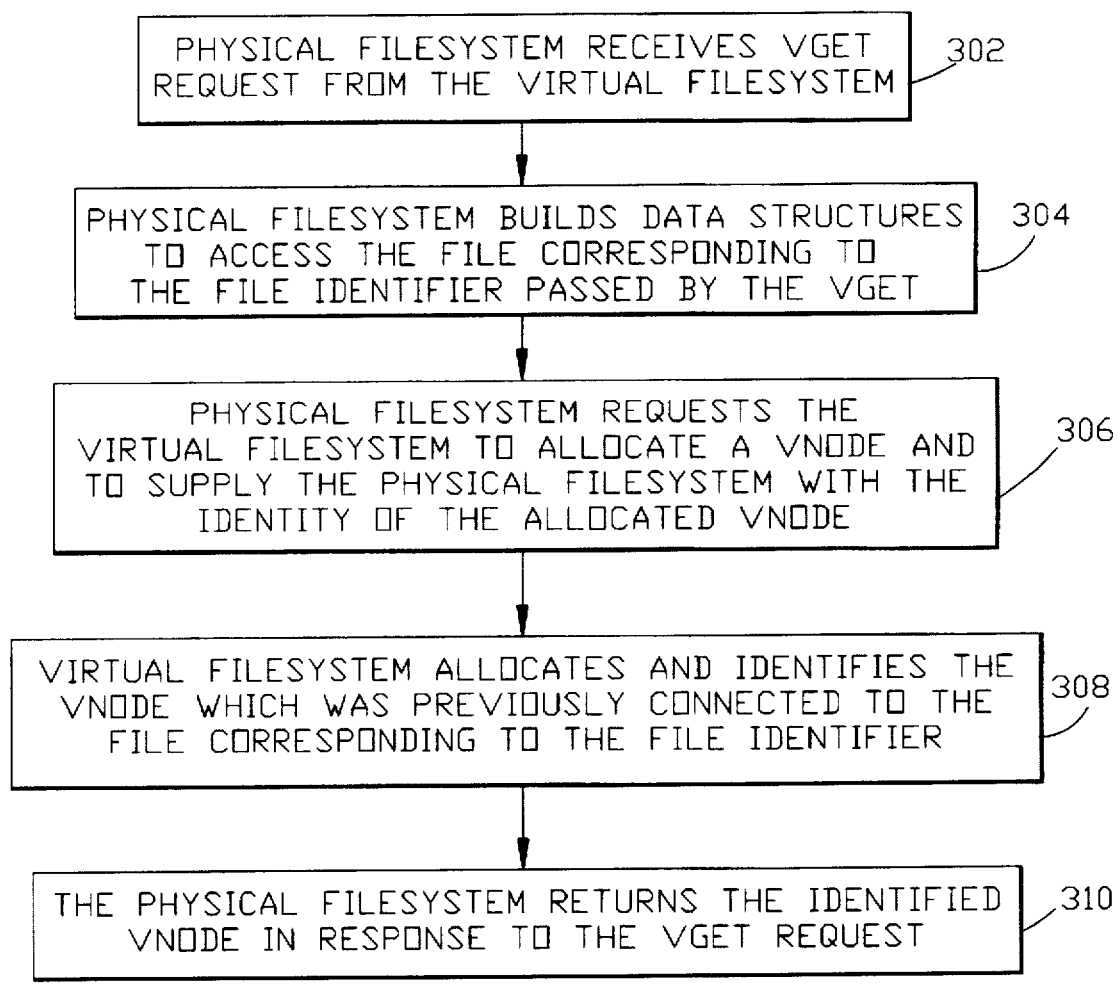
FIG. 3 is a flow chart showing the reconnection of the vnodes and inodes in the remount process of FIG. 2; and, FIG. 4 is a is a more detailed diagram of some pertinent data structures in a coupled system.

The reconnection operation is shown in more detail in FIG. 3.

In step 302, the physical filesystem receives a "vget" request from the virtual filesystem.

Next, in step 304, in response to the "vget", the physical filesystem builds its data structures to access the file corresponding to the file identifier (fid) passed by the vget.

In step 306 the physical filesystem requests the virtual filesystem to allocate a vnode and supply the identity of the allocated vnode to the physical filesystem. This is preferably accomplished by way of a single request.

In step 308, the virtual filesystem receives the request for allocation from the physical filesystem. In response the virtual filesystem identifies the vnode which was previously connected to that file. This is accomplished by passing a token to the physical filesystem.

The part of the virtual filesystem that allocates vnodes in response to requests from the physical filesystem is modified for remount. In normal operation, the virtual filesystem would find and unused vnode or allocate a new one if no unused vnodes were available. In the case of a remount, the token passed to the physical filesystem corresponds not to a new or unused vnode, but to a vnode with all of the information necessary to continue to process application requests for reading or writing the file corresponding to the file identifier.

In step 310, the physical filesystem returns the vnode in response to the vget request. It should be understood that this is done normally because the vfs would not typically know which vfs request to the physical filesystem corresponds to the allocate request. Remount is an exception because requests are made one at a time, expecting a response for the purpose of making the connections between vnodes and inodes that existed before the unmount.

It should be understood that this process differs from a conventional dismount followed by a mount in that when the filesystem is dismounted, the virtual filesystem maintains information about which vnodes correspond to which inodes as well as the information required to maintain applications access to files. In contrast, in a conventional dismount, the connection information is discarded and upon mounting, each application must reestablish its own access to the files.

When a filesystem is remounted from read-only to read/write, all of the operations that an application could have performed on the file in the old mount state will be available in the new mount state. When a filesystem is remounted from read/write to read-only, an application could have a file open for write before the remount operation and write operations on the file would not be allowed after the remount operation. There are several methods of dealing with this problem.

(1) The system can fail the remount operation if any files are open for write. In this case the system returns a failure code to the remount requester and the remount operation is not performed.

(2) The system can allow the remount operation to continue, but fail all write requests after the filesystem is mounted read-only.

(3) The system can cause any application having a file open for write to be terminated before completing the remount operation.

(4) The system could allow the remount operation to continue and the cause a remount to read/write mode to be issued if a write request is issued by an application.

Any of these methods or others could be implemented on a single system or invoked as a user specified option as part of the remount command.

Now that the invention has been described by way of the preferred embodiment, various modifications and improvements will occur to those of skill in the art. Thus, it should be understood that the preferred embodiment has been provided as an example and not as a limitation. The scope of the invention is defined by the appended claims.

We claim:

1. In a computing system wherein a filesystem can be mounted in a read-only mode wherein processes have read-only access to the data in the filesystem and a read/write mode wherein processes can read and write to the data in the file system, the improvement comprising:

an interface for receiving a remount command;

a remount processor, responsive to the remount command, for changing the file system from the read-only mode to the read-write mode and back without disruption of the processes executing in the computing system by storing information relating the filesystem to the processes during such mode changing.

2. A method for processing filesystem commands for use in a computing system wherein a filesystem can be mounted in at least one of a plurality of selectable access modes, comprising the computing system implemented steps of:

receiving a filesystem maintenance command from a process;

responsive to the command, changing the present access mode of the filesystem to another access mode without disruption of processes executing in the computing system by storing information relating the filesystem to the processes during such access mode changing.

3. The method of claim 2 wherein the selectable access modes include a read-only mode wherein the processes have read-only access to the data in the filesystem and a read/write mode wherein the processes can read and write to the data in the file system, and wherein the access mode is changed between read-write and read-only responsive to the command.

4. The method of claim 3 comprising the further step of, in response to the command, storing a current state of the filesystem.

5. The method of claim 4 comprising the further step of in response to the command, issuing an unmount request from a virtual filesystem to a physical filesystem and wherein the storing comprises storing a vnode identifier for each vnode in the virtual filesystem having a corresponding inode in the physical filesystem and an identifier of the inode corresponding to each of said vnodes.

6. The method of claim 5, comprising the further step of following the issuing of the unmount request, automatically issuing a mount request to the physical filesystem for mounting the filesystem in a different mode than an original mode prior to the unmount request being issued to the physical filesystem.

7. The method of claim 6 wherein the issuing of the mount request comprises the steps of for each said vnode in the virtual filesystem having a corresponding inode in the physical filesystem prior to the issuing of the unmount request, sending a "vget" request from the virtual filesystem to the physical filesystem identifying said each vnode and the inode that corresponded to said each vnode prior to the issuing of the unmount request.

8. The method of claim 7 comprising the further step of automatically reconnecting the identified inodes to the corresponding identified vnodes.

9. The method of claim 2 wherein the computing system is a distributed system and wherein the command is issued by a remote process.

10. A computer readable memory comprising program code that will cause a computer having a filesystem that can be mounted in a plurality of selectable access modes to switch between said access modes in a particular manner when used by the computer, said program code comprising:

program code implementing a command processor configured to receive a filesystem maintenance command from a process; and program code implementing a remount processor configured to receive the filesystem maintenance command from the command processor and being operable, responsive to the filesystem maintenance command, to change the present access mode of the filesystem to another access mode without disruption of processes executing in the computing system by storing information relating the filesystem to the processes while the access mode of the filesystem is being changed.

11. A computing system, comprising:

a storage means for storing information relating filesystems to processes;

means for receiving filesystem mount control commands from processes executing on the system or from a user of the system;

file system mounting means for mounting, responsive to a first mount control command, a filesystem in a read-only access mode wherein the processes have read-only access to the data in the filesystem, and for mounting, responsive to a second mount control command, the filesystem in a read/write access mode wherein the processes have read and write access to the data in the filesystem, and for changing, responsive to a third mount control command, the access mode of the filesystem between the read-only access mode and the read/write access mode without disruption of the processes executing in the computing system by retaining the stored information relating the filesystem to the processes while the access mode of the filesystem is changed.

12. The system of claim 11 further comprising means, responsive to the third mount control command, for storing a current state of the filesystem.

13. The system of claim 12 wherein the filesystem mounting means comprises means, responsive to the third mount control command, for issuing an unmount request from a virtual filesystem to a physical filesystem and wherein the storing comprises storing a vnode identifier for each vnode in the virtual filesystem having a corresponding inode in the physical filesystem and an identifier of the inode corresponding to each of said vnodes.

14. The system of claim 13 comprising the further step of: following the issuing of the unmount request, automatically issuing a mount request to the physical filesystem for mounting the filesystem in a different mode than an original mode prior to the unmount request being issued to the physical filesystem.

15. The system of claim 13 wherein the filesystem mounting means further comprises means for sending a "vget" request to the physical filesystem identifying each vnode in the virtual filesystem having a corresponding identified inode in the physical filesystem prior to the issuing of the unmount request and the inode that corresponded thereto.

16. The system of claim 15 wherein the filesystem mounting means further comprises means for automatically reconnecting the identified inodes to the corresponding identified vnodes.

* * * * *